(12) United States Patent
Matsubara

(10) Patent No.: US 11,243,386 B2
(45) Date of Patent: Feb. 8, 2022

(54) MICROSCOPE APPARATUS, OBSERVATION METHOD, AND MICROSCOPE APPARATUS-CONTROL PROGRAM

(71) Applicant: FUJIFILM Corporation, Tokyo (JP)

(72) Inventor: Kenta Matsubara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 320 days.

(21) Appl. No.: 16/515,555

(22) Filed: Jul. 18, 2019

(65) Prior Publication Data

US 2019/0339498 A1 Nov. 7, 2019

Related U.S. Application Data

(63) Continuation of application No. PCT/JP2017/044456, filed on Dec. 12, 2017.

(30) Foreign Application Priority Data

Feb. 27, 2017 (JP) .............................. JP2017-034680

(51) Int. Cl.
*G02B 21/00* (2006.01)
*G02B 21/02* (2006.01)
*G02B 21/24* (2006.01)
*G02B 21/26* (2006.01)

(52) U.S. Cl.
CPC ....... *G02B 21/006* (2013.01); *G02B 21/0036* (2013.01); *G02B 21/02* (2013.01); *G02B 21/244* (2013.01); *G02B 21/26* (2013.01)

(58) Field of Classification Search
CPC .............. G02B 21/006; G02B 21/0036; G02B 21/02; G02B 21/244; G02B 21/26; G02B 21/241; G02B 21/245; G02B 21/365; G02B 7/28
See application file for complete search history.

(56) References Cited

U.S. PATENT DOCUMENTS 6,657,216 B1    12/2003  Poris
2003/0036855 A1  2/2003  Harris et al.
(Continued)

FOREIGN PATENT DOCUMENTS

JP  2003-295065 A  10/2003
JP  2006-3653 A     1/2006
JP  2008-46327 A    2/2008
(Continued)

OTHER PUBLICATIONS

Korean Office Action, dated Aug. 12, 2020, for corresponding Korean Application No. 10-2019-7020871, with an English translation.

(Continued)

*Primary Examiner* — Mustak Choudhury
(74) *Attorney, Agent, or Firm* — Birch, Stewart, Kolasch & Birch, LLP

(57) ABSTRACT

There are provided a microscope apparatus, an observation method, and a microscope apparatus-control program that can more efficiently perform auto-focus control and can shorten an imaging time in a case where a culture vessel is to be scanned by an image forming optical system and the auto-focus control is to be performed at each observation position. Focus information of a culture vessel is detected by a first displacement sensor and a second displacement sensor while a stage is moved to a scanning measurement position from an initial set position, and an auto-focus control unit performs auto-focus control at every observation position on the basis of the focus information in a case where the stage has been moved to the scanning measurement position.

22 Claims, 12 Drawing Sheets

(56) References Cited

U.S. PATENT DOCUMENTS

| | | | | |
|---|---|---|---|---|
| 2006/0000962 A1* | 1/2006 | Imabayashi | ......... | G02B 21/365 |
| | | | | 250/201.2 |
| 2011/0102572 A1* | 5/2011 | Kihara | ............... | G02B 27/0025 |
| | | | | 348/79 |
| 2018/0113295 A1 | 4/2018 | Matusbara | | |

FOREIGN PATENT DOCUMENTS

| | | | |
|---|---|---|---|
| JP | 2009-198525 | A | 9/2009 |
| JP | 2010-191298 | A | 9/2010 |
| JP | 2011-95685 | A | 5/2011 |
| JP | 2017-15856 | A | 1/2017 |
| JP | 2017-15978 | A | 1/2017 |

OTHER PUBLICATIONS

International Preliminary Report on Patentability and Written Opinion of the International Searching Authority (forms PCT/IB/373, PCT/ISA/237 and PCT/IB/326), dated Sep. 6, 2019, for corresponding International Application No. PCT/JP2017/044456, with a Written Opinion translation.
International Search Report (form PCT/ISA/210), dated Mar. 20, 2018, for corresponding International Application No. PCT/JP2017/044456, with an English translation.
Japanese Office Action, dated Jul. 28, 2020 for corresponding Japanese Application No. 2019-501068, with an English translation.
Japanese Office Action, dated Apr. 21, 2020, for corresponding Japanese Application No. 2019-501068, with an English translation.
Extended European Search Report for European Application No. 17897973.8, dated Feb. 19, 2020.

* cited by examiner

STAGE-MOVING DIRECTION (FORWARD)

STAGE-MOVING DIRECTION (BACKWARD)

MICROSCOPE APPARATUS, OBSERVATION METHOD, AND MICROSCOPE APPARATUS-CONTROL PROGRAM

CROSS-REFERENCE TO RELATED APPLICATIONS

This application is a Continuation of PCT International Application No. PCT/JP2017/044456 filed on Dec. 12, 2017, which claims priority under 35 U.S.C. § 119(a) to Japanese Patent Application No. 2017-034680 filed on Feb. 27, 2017. Each of the above application(s) is hereby expressly incorporated by reference, in its entirety, into the present application.

BACKGROUND OF THE INVENTION

1. Field of the Invention

The present invention relates to a microscope apparatus, an observation method, and a microscope apparatus-control program that move a stage, on which a vessel in which an object to be observed is stored is installed, relative to an image forming optical system for forming an image of the object to be observed to form an image of the entire object to be observed.

2. Description of the Related Art

A method including imaging pluripotent stem cells, such as an embryonic stem (ES) cell and an induced pluripotent stem (iPS) cell, differentiated and induced cells, and the like by a microscope or the like and capturing the feature of images of the cells to determine a state where the cells are differentiated and the like has been proposed in the related art.

Pluripotent stem cells, such as an ES cell and an iPS cell, have been in the spotlight as cells that have a capability to be differentiated to cells of various tissues and can be applied to regenerative medicine, the development of drugs, the identification of diseases, and the like.

A method, which performs so-called tilting imaging to acquire images having a high magnification and a wide field of view in a case where cells are imaged by a microscope as described above, is proposed. Specifically, for example, the range of a culture vessel, such as a well plate, is scanned by an image forming optical system, the images at the respective observation positions are taken, and the images at the respective observation positions are then combined.

Further, apparatuses, which perform auto-focus control at each observation position in the culture vessel to acquire a high-quality image with less blur in a case where this tilting imaging is to be performed, have been proposed (see JP2010-191298A, JP2006-003653A, JP2009-198525A, and JP2008-046327A).

SUMMARY OF THE INVENTION

Here, in a case where auto-focus control is to be performed in the tilting imaging as described above, it is important to perform auto-focus control with high speed and high accuracy in terms of shortening an imaging time.

However, in a case where, for example, a well plate including a plurality of wells is used as a culture vessel, the entire well plate is scanned by the image forming optical system, and tilting imaging is performed while auto-focus control is performed at each observation position, the thicknesses of the bottom portions of the respective wells are different due to manufacturing errors or the like. Further, since the culture vessel is installed on the stage in a state where the bottom surface of the culture vessel is inclined with respect to the stage in a certain method of installing the culture vessel on the stage, an installation error occurs. For this reason, there is a case where the heights of the bottom surfaces of the respective wells are significantly different.

Auto-focus control performed in a microscope apparatus is performed by the movement of an objective lens using a piezoelectric element or the like, but there is a limit to the drive range of the objective lens.

Accordingly, if the thicknesses of the bottom portions of the adjacent wells are significantly different from each other or the above-mentioned installation errors are different from each other in a case where the positions of the bottom surfaces (surfaces on which an object to be observed is installed) of the wells are detected to perform auto-focus control, the positions of the bottom surfaces of the respective wells are significantly different from each other. For this reason, there is a problem that appropriate auto-focus control cannot be performed since the positions of the bottom surfaces of the respective wells are not in the drive range of the objective lens, or a long time is required until focusing.

A method, which includes pre-measuring the variation of the thickness of the bottom portion of the culture vessel and the installation error of the culture vessel and performing auto-focus control on the basis of the measurement results thereof, is considered for this problem. However, in a case where this pre-measurement is performed separately from an imaging operation (an operation until scanning measurement ends after the culture vessel is installed on the stage), an imaging time is lengthened by time required for the pre-measurement.

The invention has been made in consideration of this problem, and an object of the invention is to provide a microscope apparatus, an observation method, and a microscope apparatus-control program that can more efficiently perform auto-focus control and can shorten an imaging time.

A microscope apparatus according to an aspect of the invention comprises a stage on which a vessel in which an object to be observed is stored is installed, an image forming optical system that includes an objective lens forming an image of the object to be observed stored in the vessel, a stage drive unit that moves the stage between an initial set position where the vessel is to be installed on the stage and a scanning measurement position where observation positions in the vessel are to be scanned by the image forming optical system, a scanning control unit that moves at least one of the stage or the image forming optical system at the scanning measurement position to scan the respective observation positions in the vessel by the image forming optical system, an auto-focus control unit that performs auto-focus control at every observation position, and a focus information-detection unit that detects focus information of the vessel while the stage is moved to the scanning measurement position from the initial set position. The auto-focus control unit performs the auto-focus control at every observation position on the basis of the focus information in a case where the stage has been moved to the scanning measurement position.

In the microscope apparatus according to the aspect of the invention, the focus information-detection unit can detect a position of a bottom surface of the vessel as the focus information.

In the microscope apparatus according to the aspect of the invention, the focus information-detection unit can detect at least three portions of the bottom surface of the vessel.

The microscope apparatus according to the aspect of the invention can further comprise a vessel information-acquisition unit that acquires information about a type of the vessel installed on the stage, and the stage drive unit can change a movement path of the stage extending to the scanning measurement position from the initial set position on the basis of the information about the type of the vessel.

In the microscope apparatus according to the aspect of the invention, a well plate including a plurality of wells can be used as the vessel.

The microscope apparatus according to the aspect of the invention can further comprise at least two displacement sensors that are arranged in a scanning direction with the image forming optical system interposed therebetween, and the auto-focus control unit can perform the auto-focus control on the basis of the focus information and a position of the vessel in a vertical direction at an observation position that is antecedently detected by the displacement sensor before the image forming optical system reaches one of the observation position in the vessel.

In the microscope apparatus according to the aspect of the invention, the displacement sensors can also be used as the focus information-detection unit, and the stage drive unit can move the stage so that the stage passes above the displacement sensors while being moved to the scanning measurement position from the initial set position.

In the microscope apparatus according to the aspect of the invention, the focus information-detection unit can include a displacement sensor for detecting focus information that is different from the displacement sensors.

In the microscope apparatus according to the aspect of the invention, the movement path of the stage extending to the scanning measurement position from the initial set position can include movement paths in a plurality of directions.

An observation method according to another aspect of the invention is an observation method including moving a stage, on which a vessel in which an object to be observed is stored is installed, from an initial set position where the vessel is to be installed to a scanning measurement position different from the initial set position and moving at least one of the stage or an image forming optical system, which includes an objective lens forming an image of the object to be observed stored in the vessel, at the scanning measurement position to scan observation positions in the vessel and to observe the object to be observed. The observation method comprises detecting focus information of the vessel while the stage is moved to the scanning measurement position from the initial set position, and performing auto-focus control at every observation position in the vessel on the basis of the focus information in a case where the stage has been moved to the scanning measurement position.

A microscope apparatus-control program according to another aspect of the invention is a microscope apparatus-control program causing a computer to perform a step of moving a stage, on which a vessel in which an object to be observed is stored is installed, from an initial set position where the vessel is to be installed to a scanning measurement position, and a step of moving at least one of the stage or an image forming optical system, which includes an objective lens forming an image of the object to be observed stored in the vessel, at the scanning measurement position to scan observation positions in the vessel. The microscope apparatus-control program causes the computer to perform a step of detecting focus information of the vessel while the stage is moved to the scanning measurement position from the initial set position, and a step of performing auto-focus control at every observation position in the vessel on the basis of the focus information in a case where the stage has been moved to the scanning measurement position.

According to the microscope apparatus, the observation method, and the microscope apparatus-control program of the invention, the focus information of the vessel is detected while the stage is moved to the scanning measurement position from the initial set position, and auto-focus control is performed at every observation position in the vessel on the basis of the focus information in a case where the stage has been moved to the scanning measurement position. Accordingly, even though there is large variation of the thickness of the bottom portion of the culture vessel or there is an installation error of the culture vessel, auto-focus control can be efficiently performed. Further, since pre-measurement or the like is not performed during an imaging operation, an imaging time can be shortened.

DESCRIPTION OF THE PREFERRED EMBODIMENTS

Figure 1:
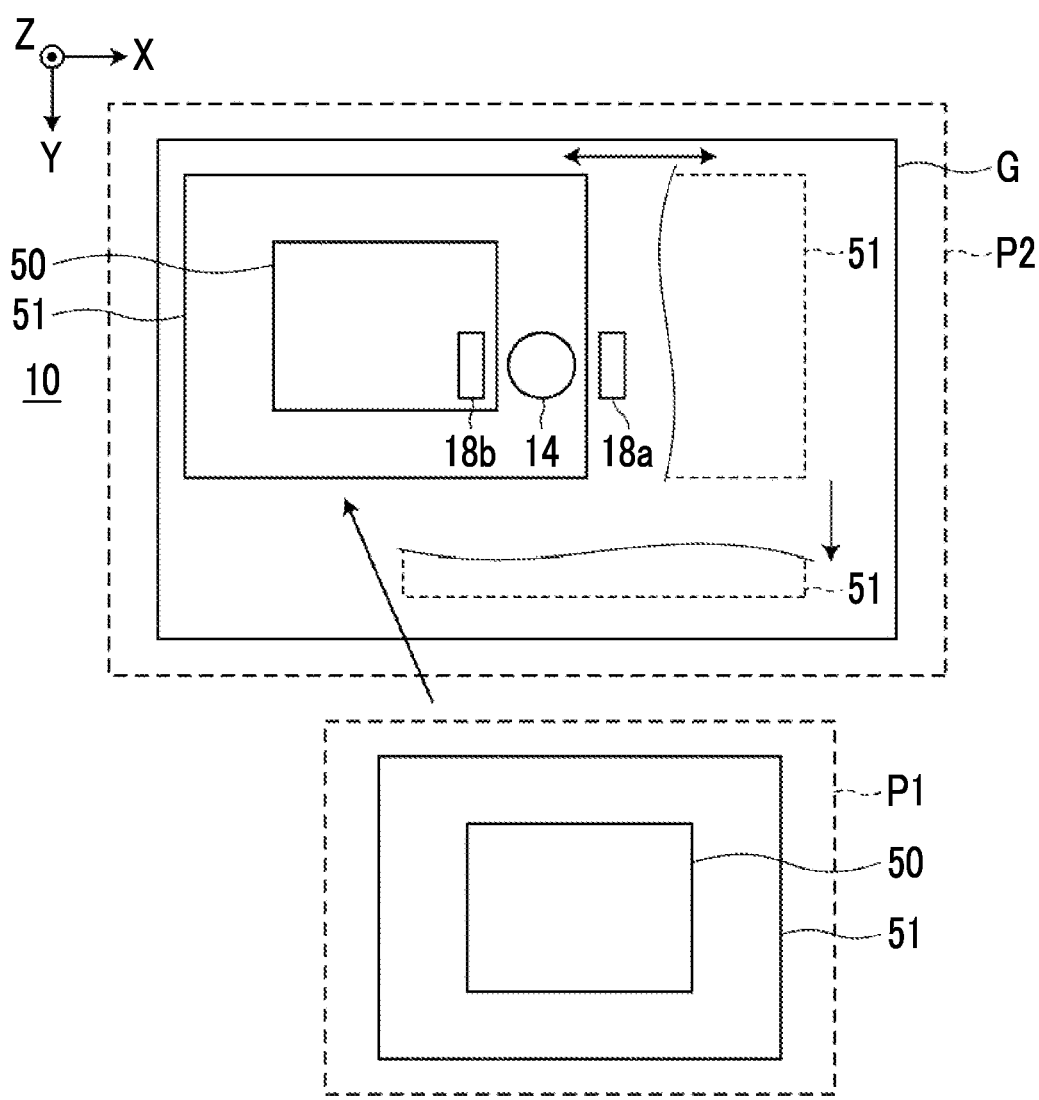
FIG. 1 is a diagram showing the schematic configuration of a microscope apparatus according to an embodiment of the invention that is viewed from above.

A microscopic observation system using a microscope apparatus according to an embodiment of the invention will be described in detail below with reference to the drawings. FIG. 1 is a diagram showing a microscope apparatus 10 of the microscopic observation system of this embodiment that is viewed from above.

The microscope apparatus 10 moves a stage 51, on which a culture vessel 50 (corresponding to a vessel of the invention) in which an object to be observed is stored is installed, relative to an image forming optical system 14 in an X direction and a Y direction to scan each observation position in the culture vessel 50 and forms the image at each observation position by the image forming optical system 14. Here, each of the X direction and the Y direction is orthogonal to the direction of an optical axis of the image forming optical system 14. Further, the X direction and the Y direction are orthogonal to each other.

Further, an initial set position P1 and a scanning measurement position P2 are preset in the microscope apparatus 10 of this embodiment as shown in FIG. 1, and the stage 51 is disposed at the initial set position P1 first and is then moved to the scanning measurement position P2.

The initial set position P1 is a portion where the culture vessel 50 is to be installed on the stage 51. That is, the stage 51 is disposed at the initial set position P1 first, and a user installs the culture vessel 50 on the stage 51 disposed at the initial set position P1. As shown in FIG. 1, the initial set position P1 is provided at a position different from the scanning measurement position P2. Since a heat glass G is installed at the scanning measurement position P2 in the microscope apparatus 10 of this embodiment, the culture vessel 50 cannot be directly installed on the stage 51 disposed at the scanning measurement position P2.

Accordingly, the culture vessel 50 is adapted to be capable of being installed on the stage 51 in a state where the stage 51 is made to temporarily retreat to the initial set position P1 provided at a location different from the scanning measurement position P2. The heat glass G is provided above the stage 51 and is heated to a predetermined temperature. Since the culture vessel 50 taken out of an incubator or the like is heated using the heat glass it is possible to prevent the culture vessel 50 from being fogged due to dew condensation.

The stage 51 is moved relative to the image forming optical system 14 in the X direction and the Y direction at the scanning measurement position P2 as described above, so that each observation position in the culture vessel 50 is scanned by the image forming optical system 14.

Figure 2:
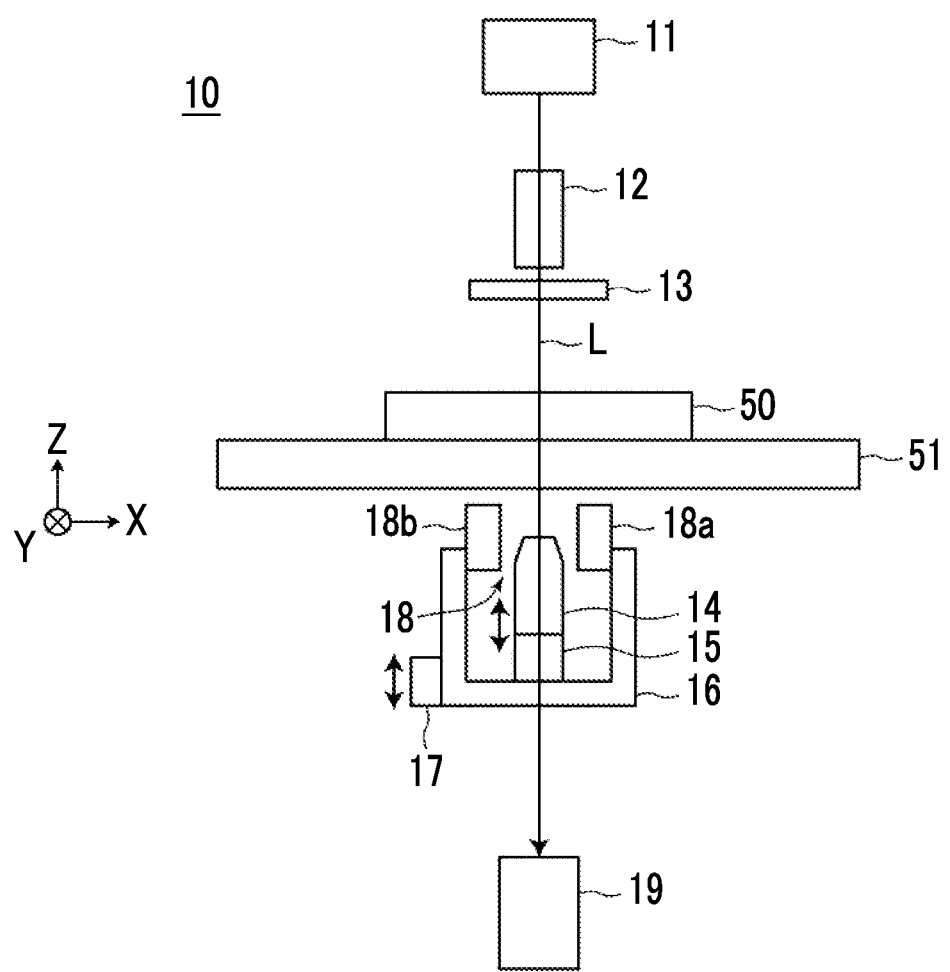
FIG. 2 is a diagram showing the specific configuration of the microscope apparatus according to the embodiment of the invention.

FIG. 2 is a diagram showing the specific configuration of the microscope apparatus 10. The microscope apparatus 10 of this embodiment takes the phase-contrast images of cultured cells that are an object to be observed. Specifically, as shown in FIG. 2, the microscope apparatus 10 comprises a white light source 11 that emits white light, a condenser lens 12, a slit plate 13, an image forming optical system 14, an image forming optical system-drive unit 15, a detection unit 18, and an imaging element 19. The white light source 11, the condenser lens 12, the slit plate 13, and the imaging element 19 are arranged on the optical axis of the image forming optical system 14 extending in a Z direction of FIG. 1. The above-mentioned heat glass G is not shown in FIG. 2.

Figure 3:
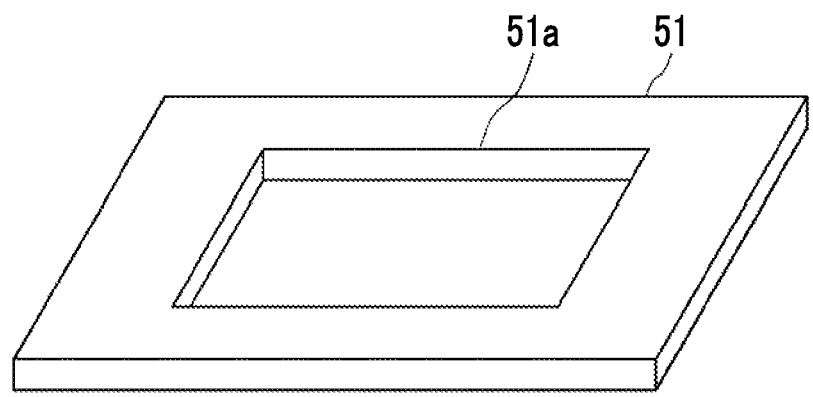
FIG. 3 is a perspective view showing the schematic structure of a stage.

FIG. 3 is a diagram showing an example of the stage 51. A rectangular opening 51a is formed at the center of the stage 51. The culture vessel 50 is installed on a frame member forming the opening 51a, and the phase-contrast images of the cells present in the culture vessel 50 pass through the opening 51a.

In this embodiment, a well plate comprising a plurality of wells in which cells are to be stored is used as the culture vessel 50. However, the culture vessel is not limited to the well plate, and a scahle, a dish, or the like may be used other than the well plate. Further, examples of the cells stored in the culture vessel 50 include: pluripotent stem cells, such as an iPS cell and an ES cell; the cells of the nerve, the skin, the cardiac muscle, and the liver that are differentiated and induced from stem cells; the cells of the skin, the retina, the cardiac muscle, the blood cells, the nerve, and the organ obtained from the human body; and the like.

In the slit plate 13, a light-blocking plate, which blocks white light emitted from the white light source 11, is provided with a ring-shaped slit that transmits white light. White light passes through the slit, so that ring-shaped illumination light L is formed.

Figure 4:
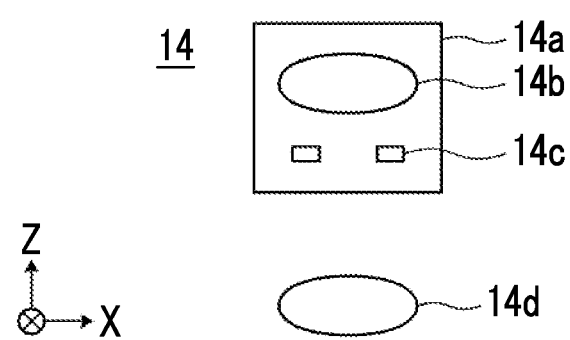
FIG. 4 is a schematic diagram showing the configuration of an image forming optical system.

FIG. 4 is a diagram showing the detailed configuration of the image forming optical system 14. As shown in FIG. 4, the image forming optical system 14 comprises a phase-contrast lens 14a and an image forming lens 14d. Further, the phase-contrast lens 14a comprises an objective lens 14b and a phase plate 14c. The phase plate 14c is a plate where a phase ring is formed in a transparent plate that is transparent to the wavelength of the illumination light L. The size of the slit of the above-mentioned slit plate 13 is in a relation conjugate to the phase ring of the phase plate 14c.

The phase ring includes a phase film and a neutral density filter that are formed in the shape of a ring. The phase film shifts the phase of incident light by ¼ of a wavelength, and the neutral density filter reduces the amount of incident light. In a case where direct light incident on the phase ring passes through the phase ring, the phase of the direct light is shifted by ¼ of a wavelength and the brightness of the direct light is reduced. On the other hand, most of diffracted light, which is diffracted by an object to be observed, passes through the transparent plate of the phase plate 14c and the phase and brightness of the diffracted light are not changed.

The phase-contrast lens 14a including the objective lens 14b is moved in the direction of an optical axis of the objective lens 14b by the image forming optical system-drive unit 15. In this embodiment, the direction of the optical axis of the objective lens 14b and the Z direction (vertical direction) are the same direction. Auto-focus control is performed through the movement of the phase-contrast lens 14a in the Z direction, so that the contrast of each phase-contrast image taken by the imaging element 19 is adjusted. Further, in this embodiment, auto-focus control is performed through the movement of the objective lens 14b in the direction of the optical axis. However, the invention is not limited thereto and auto-focus control may be performed through the movement of the stage 51 in the Z direction.

Furthermore, the magnification of the phase-contrast lens 14a may be adapted to be changed. Specifically, the phase-contrast lens 14a or the image forming optical system 14 having different magnifications may be adapted to be exchangeable. The interchange of the phase-contrast lens 14a or the image forming optical system 14 may be automatically performed or may be manually performed by a user.

The image forming optical system-drive unit 15 comprises, for example, an actuator, such as a piezoelectric element, and is driven on the basis of a control signal output from an auto-focus control unit 22 to be described later. The image forming optical system-drive unit 15 is adapted to allow the phase-contrast images, which have passed through the phase-contrast lens 14a, to pass therethrough just as it is. Further, the structure of the image forming optical system-drive unit 15 is not limited to a piezoelectric element, and has only to be capable of moving the phase-contrast lens 14a in the Z direction and can employ other publicly known structures.

The phase-contrast images, which have passed through the phase-contrast lens 14a and the image forming optical system-drive unit 15, are incident on the image forming lens 14d, and the image forming lens 14d forms the incident phase-contrast images on the imaging element 19.

The imaging element 19 takes the phase-contrast images that are formed by the image forming lens 14d. A charge-coupled device (CCD) image sensor, a complementary metal-oxide semiconductor (CMOS) image sensor, or the like is used as the imaging element 19. As the imaging element, an imaging element, which is provided with a color filter of RGB (Red Green Blue), may be used or a monochromatic imaging element may be used.

The detection unit 18 detects the position of the bottom surface of the culture vessel 50, which is installed on the stage 51, in the Z direction (vertical direction). Specifically, the detection unit 18 comprises a first displacement sensor 18a and a second displacement sensor 18b.

The first and second displacement sensors 18a and 18b are arranged in the X direction (scanning direction) with the image forming optical system 14 (objective lens 14b) interposed therebetween. Each of the first and second displacement sensors 18a and 18b of this embodiment is a laser displacement meters, and detects the position of the bottom surface of the culture vessel 50 in the Z direction by irradiating the culture vessel 50 with laser light and detecting reflected light. The bottom surface of the culture vessel 50 is a boundary surface between the bottom portion of the culture vessel 50 and the cells, which are an object to be observed, that is, is an installation surface for an object to be observed.

Information about the position of the culture vessel 50 in the Z direction, which is detected by the detection unit 18, is output to the auto-focus control unit 22 to be described later, and the auto-focus control unit 22 controls the image forming optical system-drive unit 15 on the basis of the input information about the position to perform auto-focus control.

More specifically, before the image forming optical system 14 reaches a predetermined observation position in the culture vessel 50 installed on the stage 51, information about the position of the culture vessel 50 in the Z direction at the observation position is antecedently detected by the first displacement sensor 18a or the second displacement sensor 18b in the microscope apparatus 10 of this embodiment. Then, in a case where the image forming optical system 14 reaches the observation position, the auto-focus control unit 22 controls the image forming optical system-drive unit 15 on the basis of the information about the position, which is detected by the first displacement sensor 18a or the second displacement sensor 18b, to perform auto-focus control.

Here, in a case where the auto-focus control unit 22 controls the image forming optical system-drive unit 15 on the basis of the information about the position of the culture vessel 50 in the Z direction to perform auto-focus control as described above, there is a limit to the drive range of the image forming optical system-drive unit 15 that is formed of a piezoelectric element or the like. On the other hand, since the variation of the position of the bottom surface of each well is caused by the manufacturing variation of the thickness of the bottom of the culture vessel 50 made of plastic, such as a well plate, there is a case where appropriate auto-focus control cannot be performed in the drive range of the image forming optical system-drive unit 15. Further, since the culture vessel 50 is installed on the stage 51 in a state where the bottom surface of the culture vessel 50 is inclined with respect to the stage 51 in a certain method of installing the culture vessel 50 on the stage 51, an installation error occurs. For this reason, there is a case where appropriate auto-focus control cannot be performed in the drive range of the image forming optical system-drive unit 15.

Accordingly, in this embodiment, the variation of the thickness of the bottom portion of the culture vessel 50 and the installation error of the culture vessel 50 having been described above are measured in advance, and the image forming optical system-drive unit 15 is moved in the Z direction on the basis of the measurement results thereof to perform the initial setting of auto-focus control so that appropriate auto-focus control can be performed in the drive range of the image forming optical system-drive unit 15.

Specifically, in the microscope apparatus 10 of this embodiment, the image forming optical system 14, the image forming optical system-drive unit 15, and the detection unit 18 are installed and held in a holder 16 as shown in FIG. 2. Further, the holder 16 is provided with an initial adjustment mechanism 17, and the holder 16 is moved in the Z direction by the initial adjustment mechanism 17. The initial adjustment mechanism 17 comprises, for example, a pulse motor and the like. In this embodiment, the initial adjustment mechanism 17 is controlled on the above-mentioned measurement result to perform the initial setting of auto-focus control.

However, in a case where the measurement of the variation of the thickness of the bottom portion of the culture vessel 50 and the like is performed separately from an imaging operation (an operation until scanning measurement ends after the culture vessel 50 is installed on the stage 51) as described above, an imaging time is additionally lengthened by time required for the measurement.

Figure 5:
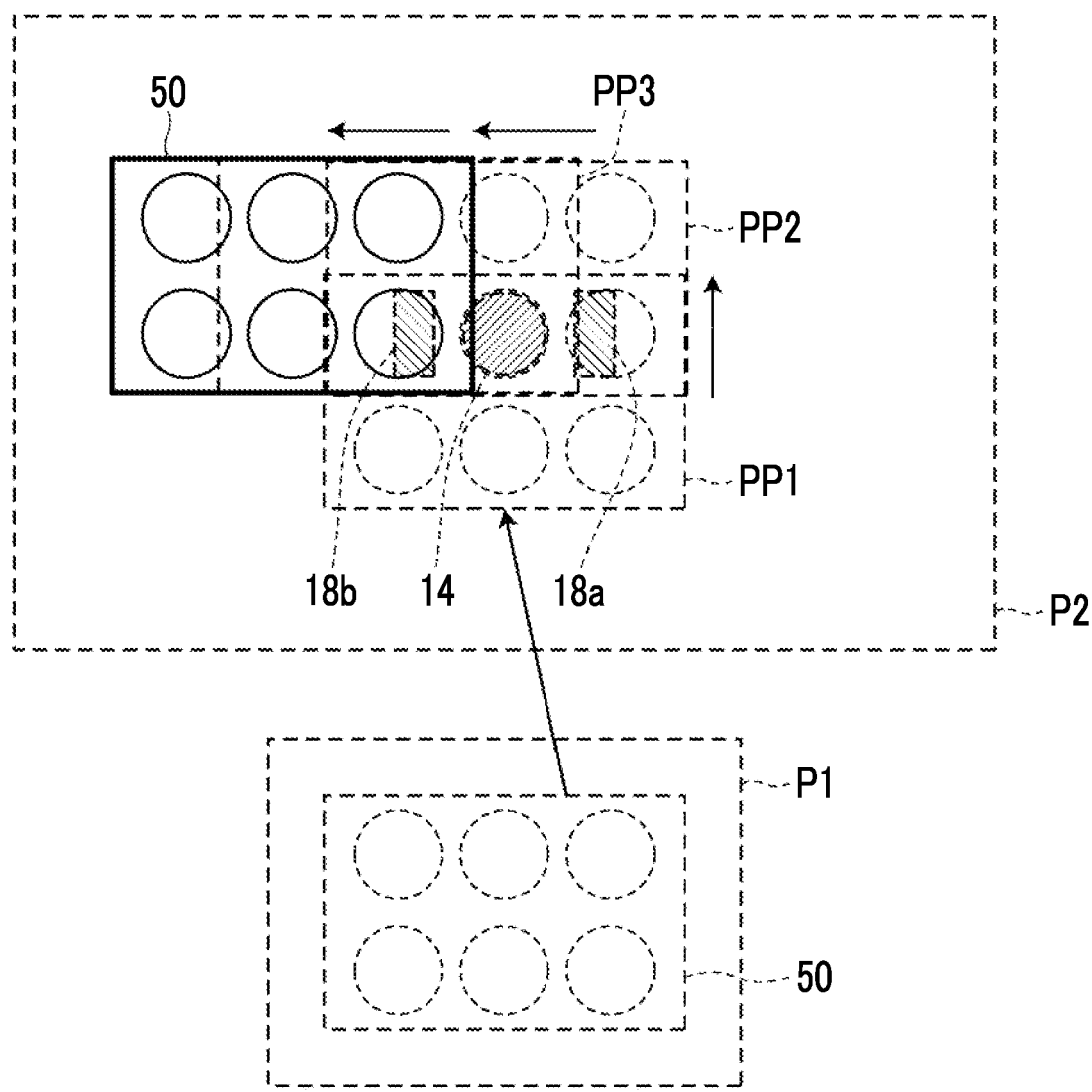
FIG. 5 is a diagram showing the movement path of the stage in a case where a culture vessel is a well plate including 6 wells.

Accordingly, in this embodiment, the variation of the thickness of the bottom portion of the culture vessel 50 and the installation error of the culture vessel 50 are measured during the imaging operation. Specifically, the variation of the thickness of the bottom portion of the culture vessel 50 and the installation error of the culture vessel 50 are measured while the stage 51 is moved to the scanning measurement position P2 from the initial set position P1. FIG. 5 shows the movement path of the stage 51 in a case where the culture vessel 50 is a well plate including 6 wells. As shown in FIG. 5, the movement path of the stage 51 extending to the scanning measurement position P2 from the initial set position P1 includes movement paths in a plurality of directions.

Then, while the stage 51 is moved to the scanning measurement position P2 from the initial set position P1, the stage 51 is moved so as to pass above the first and second displacement sensors 18a and 18b. Accordingly, the bottom surface of the culture vessel 50 installed on the stage 51 is detected by the first and second displacement sensors 18a and 18b. In this embodiment, the detection unit 18 corresponds to a focus information-detection unit of the invention. In this embodiment, focus information is information about the position of the bottom surface of the culture vessel 50 in the Z direction.

Figure 6:
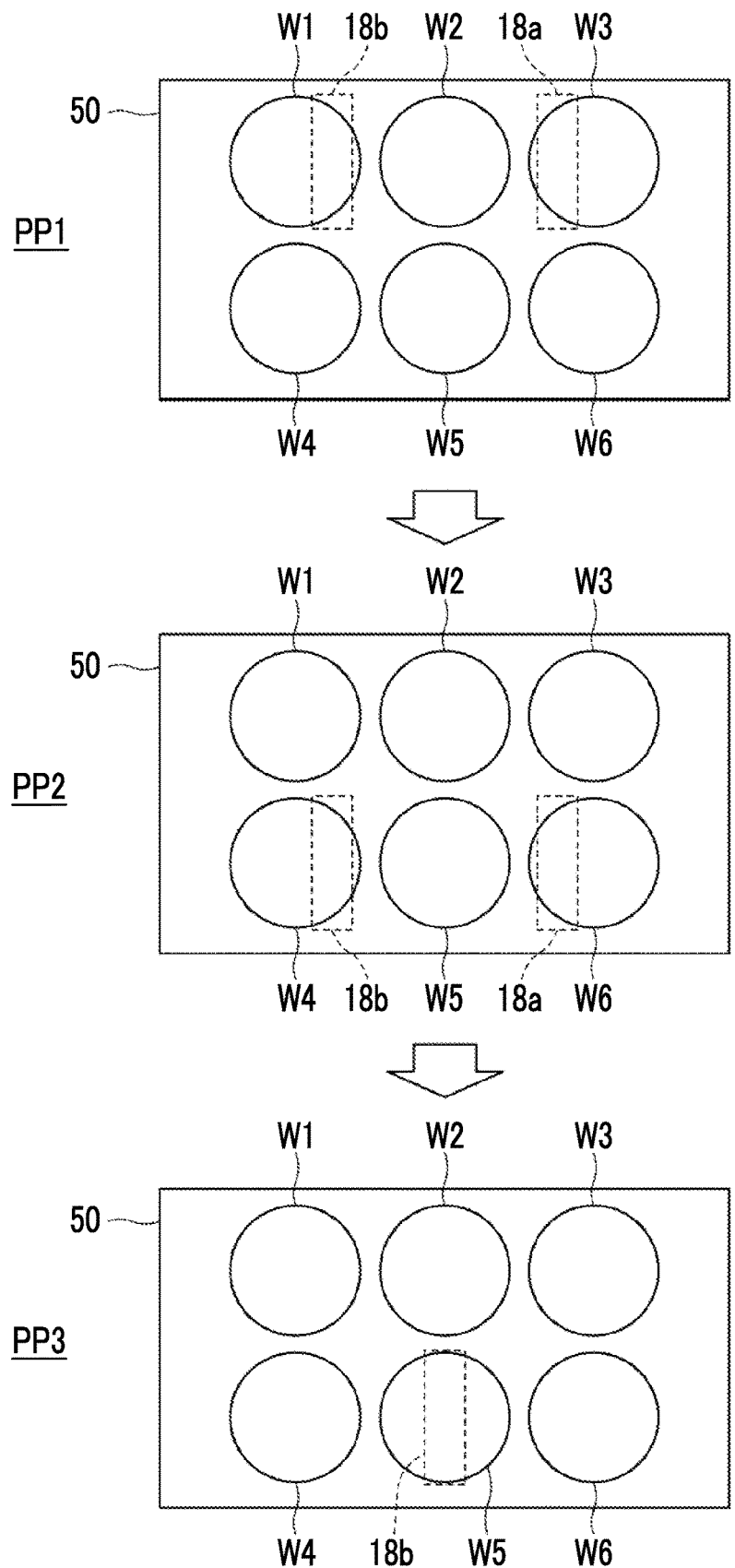
FIG. 6 is a diagram showing detection locations on the bottom surface of the culture vessel in a case where the stage is moved along the movement path shown in FIG. 5.

Specifically, in a case where the culture vessel 50 is moved to a position PP1 shown in FIG. 5, information about the position of the bottom surface of a well W1 of the culture vessel 50 in the Z direction is detected by the second displacement sensor 18b and information about the position of the bottom surface of a well W3 in the Z direction is detected by the first displacement sensor 18a as shown in FIG. 6. Then, in a case where the culture vessel 50 is moved to a position PP2 shown in FIG. 5, information about the position of the bottom surface of a well W4 of the culture vessel 50 in the Z direction is detected by the second displacement sensor 18b and information about the position of the bottom surface of a well W6 in the Z direction is detected by the first displacement sensor 18a. After that, in a case where the culture vessel 50 is moved to a position PP3 shown in FIG. 5, information about the position of the bottom surface of a well W5 of the culture vessel 50 in the Z direction is detected by the second displacement sensor 18b. In this embodiment, information about the position of the bottom surface of a well W2 in the Z direction is detected by none of the first displacement sensor 18a and the second displacement sensor 18b.

It is preferable that information about the positions of at least three portions of the bottom surface of the culture vessel 50 in the Z direction is detected as described above, and it is more preferable that information about the positions of four or more portions of the bottom surface of the culture vessel 50 in the Z direction is detected. Further, in a case where a well plate is used as the culture vessel 50 as in this embodiment, it is preferable that information about the positions of the bottom surfaces of at least 3 wells in the Z direction is detected and it is more preferable that information about the positions of the bottom surfaces of 4 or more wells in the Z direction is detected.

The information about the position of the bottom surface of the culture vessel 50 in the Z direction, which is detected by the first and second displacement sensors 18a and 18b while the stage 51 is moved to the scanning measurement position P2 from the initial set position P1, is output to the auto-focus control unit 22. The auto-focus control unit 22 calculates the central value of auto-focus control at each observation position in the culture vessel 50 on the basis of the input information about the position of the bottom surface of the culture vessel 50 in the Z direction. The central value of auto-focus control of this embodiment is a value that represents the initial position of the objective lens 14b in a case where the objective lens 14b is moved in the direction of the optical axis to perform auto-focus control.

Since information about the positions of the bottom surfaces of 5 wells in the Z direction is detected as described above in this embodiment, interpolation calculation or the like is performed using the information about the five positions in the Z direction to calculate the central value of auto-focus control at each observation position in the culture vessel 50. The auto-focus control unit 22 may be adapted to estimate the bottom surface of the entire culture vessel 50 by using the information about the five positions in the Z direction, and to calculate the central value at each observation position on the basis of the estimated bottom surface of the entire culture vessel 50.

In a case where the auto-focus control unit 22 performs auto-focus control at each observation position in the culture vessel 50, the auto-focus control unit 22 controls the initial adjustment mechanism 17 by using the central value of auto-focus control at each observation position, which is calculated as described above, as initial setting in a case where the image forming optical system 14 reaches each observation position. Accordingly, the holder 16 is moved in the Z direction. Specifically, the holder 16 is moved in the Z direction so that the position of the objective lens 14b in the Z direction becomes a position corresponding to the central value.

After that, the auto-focus control unit 22 controls the image forming optical system-drive unit 15 on the basis of the information about the position, which is antecedently detected by the first displacement sensor 18a or the second displacement sensor 18b before the image forming optical system 14 reaches the observation position as described above, to perform auto-focus control.

Auto-focus control is performed at all observation positions in the culture vessel 50 in this embodiment, but the invention is not necessarily limited thereto. For example, auto-focus control may be performed at every two or more observation positions. "Auto-focus control is performed at every observation position" of the invention also includes a method of performing auto-focus control at every two observation positions as described above.

Figure 7:
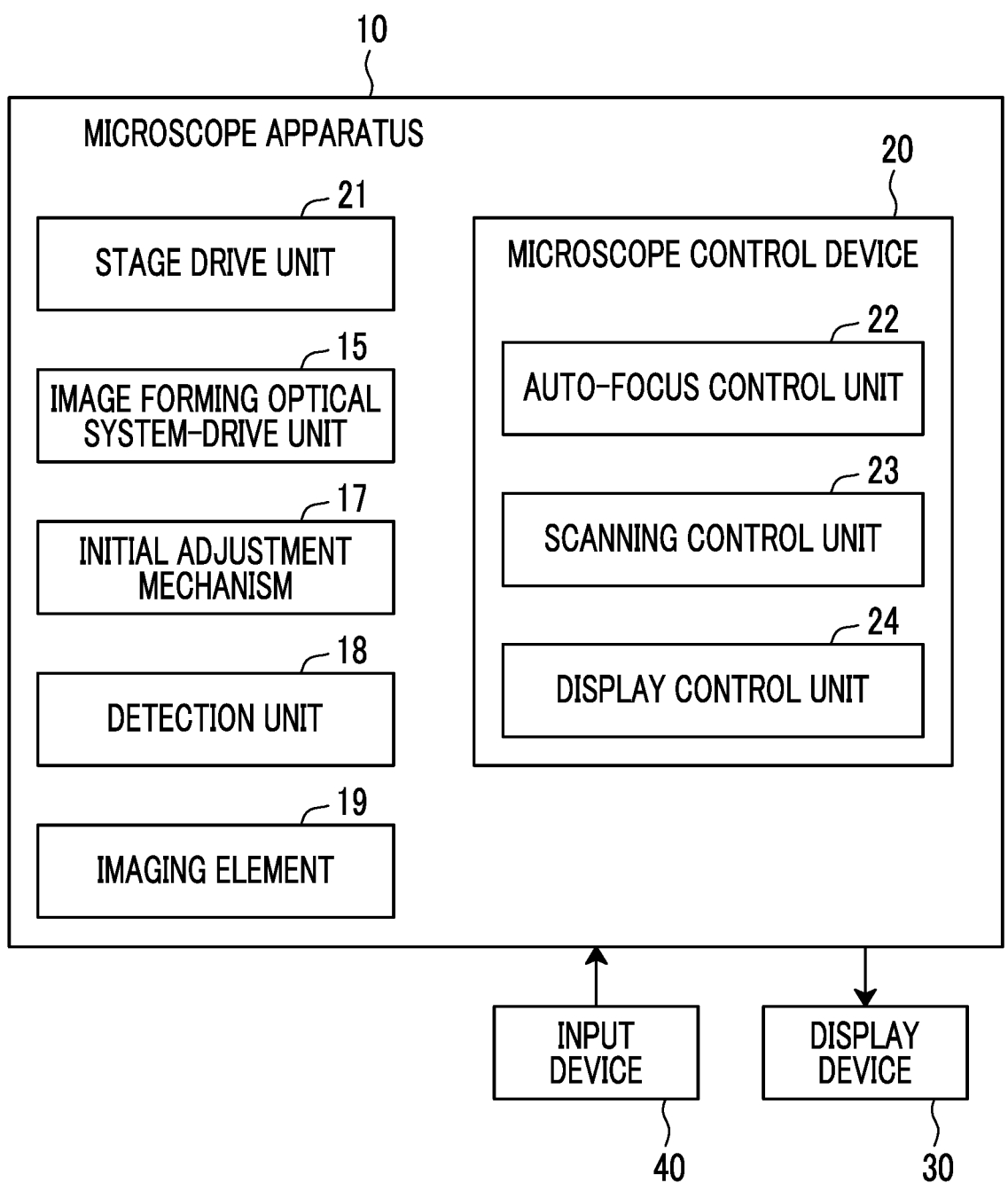
FIG. 7 is a block diagram showing the schematic configuration of a microscopic observation system that uses the microscope apparatus according to the embodiment of the invention.

Next, the configuration of a microscope control device 20 controlling the microscope apparatus 10 will be described. FIG. 7 is a block diagram showing the configuration of the microscopic observation system of this embodiment. A block diagram showing a part of the configuration controlled by the respective parts of the microscope control device 20 is shown in regard to the microscope apparatus 10.

The microscope control device 20 controls the entire microscope apparatus 10, and particularly comprises an auto-focus control unit 22, a scanning control unit 23, and a display control unit 24.

The microscope control device 20 is formed of a computer comprising a central processing unit, a semiconductor memory, a hard disk drive, and the like; and a microscope apparatus-control program according to an embodiment of the invention is installed in the hard disk drive. Then, the microscope apparatus-control program is executed by the central processing unit, so that the auto-focus control unit 22, the scanning control unit 23, and the display control unit 24 shown in FIG. 7 function.

The auto-focus control unit 22 calculates the central value of auto-focus control at each observation position in the culture vessel 50 on the basis of the information about the position of the culture vessel 50 in the Z direction that is detected by the first and second displacement sensors 18a and 18b while the stage 51 is moved to the scanning measurement position P2 from the initial set position P1 as described above. Then, in a case where the auto-focus control unit 22 is to perform auto-focus control at each observation position in the culture vessel 50, the auto-focus control unit 22 controls the initial adjustment mechanism 17 on the basis of the calculated central value to move the holder 16 in the Z direction and to perform initial setting.

In addition, in a case where the auto-focus control unit 22 is to perform auto-focus control at each observation position in the culture vessel 50, the auto-focus control unit 22 drives the image forming optical system-drive unit 15 on the basis of the information about the position of the culture vessel 50 in the Z direction at each observation position, which is antecedently detected by the first displacement sensor 18a or the second displacement sensor 18b, after performing the above-mentioned initial setting. Then, the objective lens 14b of the image forming optical system 14 is moved in the direction of the optical axis by the drive of the image forming optical system-drive unit 15, so that final auto-focus control is performed.

The scanning control unit 23 controls the drive of a stage drive unit 21 to move the stage 51 in an X-Y plane. The stage drive unit 21 is formed of an actuator that includes a piezoelectric element and the like.

Figure 8:
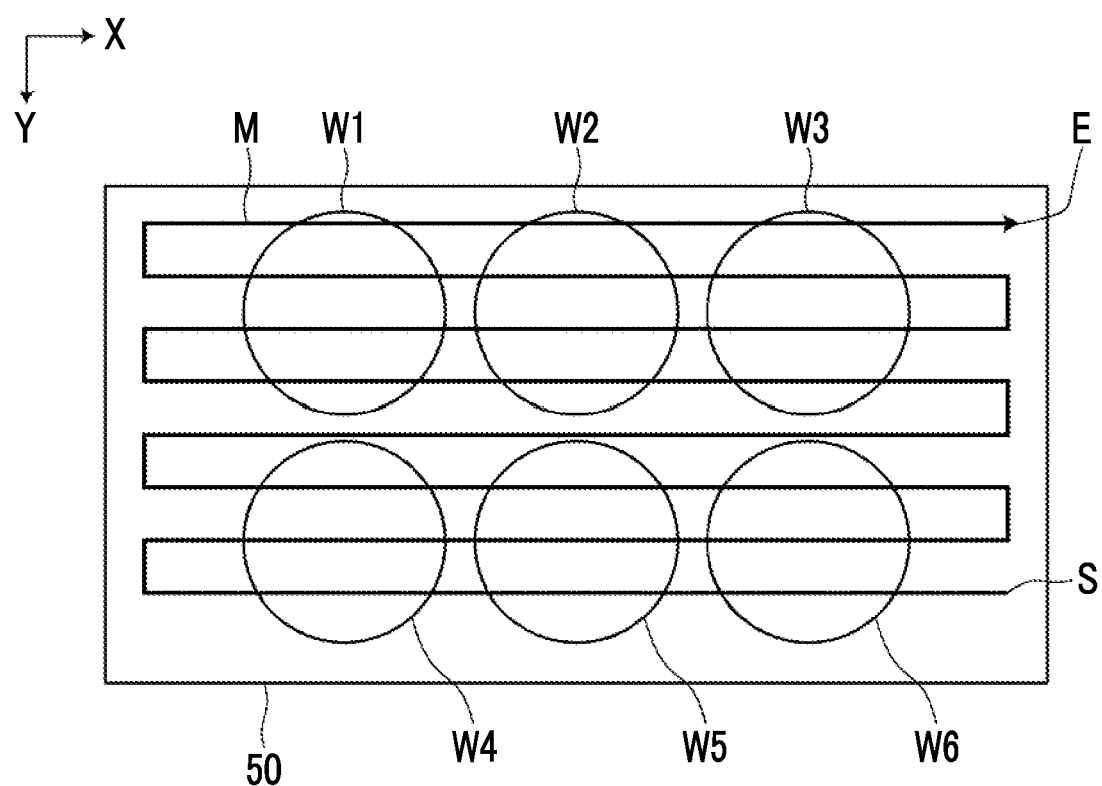
FIG. 8 is a diagram showing scanning positions at observation positions in the culture vessel.

The scanning control unit 23 moves the stage 51 to the scanning measurement position P2 from the initial set position P1 as described above by controlling the drive of the stage drive unit 21, moves the stage 51 in the X direction and the Y direction at the scanning measurement position P2, scans the observation positions in the culture vessel 50 in a two-dimensional shape, and takes the phase-contrast images at the respective observation positions. FIG. 8 is a diagram showing scanning positions at the observation positions in the culture vessel 50 by using a scanning path M.

As shown in FIG. 8, the culture vessel 50 is scanned along the scanning path M from a scanning start position S to a scanning end position E through the movement of the stage 51 in the X direction and the Y direction. That is, the forward and backward movement of the stage 51 in the X direction and the movement of the stage 51 in the Y direction are repeatedly performed, so that the observation positions in the culture vessel 50 are scanned in a two-dimensional shape.

Next, returning to FIG. 7, the display control unit 24 combines the phase-contrast images at the respective observation positions, which are taken by the microscope apparatus 10, to generate one composite phase-contrast image, and makes a display device 30 display the composite phase-contrast image.

The display device 30 displays the composite phase-contrast image that is generated by the display control unit 24 as described above, and comprises, for example, a liquid crystal display. Further, the display device 30 may be formed of a touch panel and may also be used as an input device 40.

The input device 40 comprises a mouse, a keyboard, and the like, and various kinds of setting are input to the input device 40 by a user. For example, setting, such as an instruction to change the magnification of the phase-contrast lens 14a and an instruction to change the moving speed of the stage, is input to the input device 40 of this embodiment.

Figure 9:
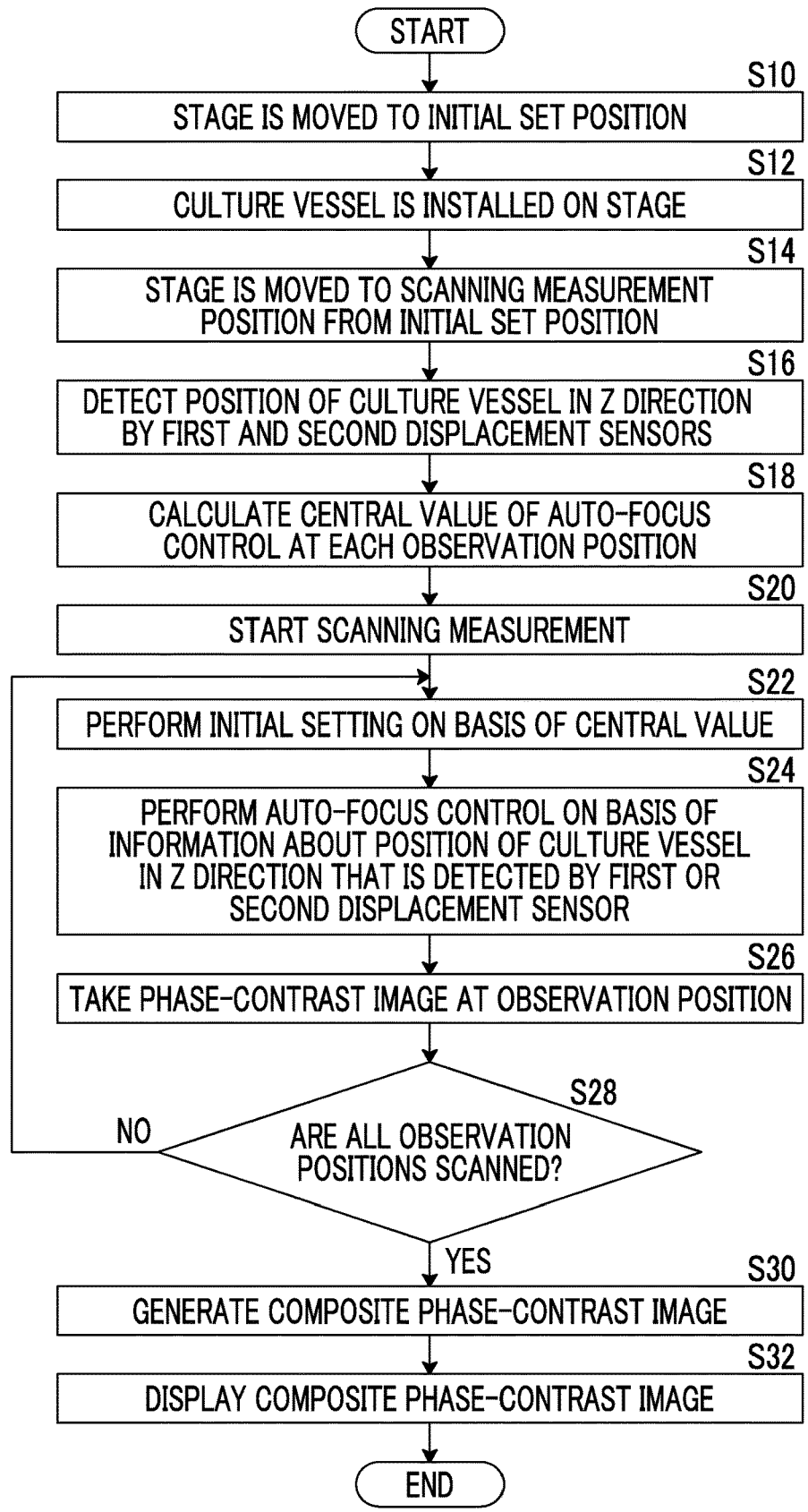
FIG. 9 is a flowchart illustrating the action of the microscopic observation system that uses the microscope apparatus according to the embodiment of the invention.

Next, the action of the microscopic observation system of this embodiment will be described with reference to a flowchart shown in FIG. 9.

First, the stage 51 is moved to the initial set position P1 and is installed (S10). Then, the culture vessel 50 in which cells as an object to be observed are stored is installed on the stage 51 (S12).

After that, the culture vessel 50 is installed on the stage 51 at the initial set position P1, the stage 51 is moved to the scanning measurement position P2 from the initial set position P1 (S14). Specifically, the stage 51 is moved along the movement path shown in FIG. 5 and the scanning start position S in the culture vessel 50 shown in FIG. 8 is moved to a place positioned above the second displacement sensor 18b.

Further, while the stage 51 is moved to the scanning measurement position P2 from the initial set position P1, the position of the bottom surface of the culture vessel 50 in the Z direction is detected by the first and second displacement sensors 18a and 18b as described above (S16).

Information about the position of the bottom surface of the culture vessel 50 in the Z direction, which is detected in S16, is acquired by the auto-focus control unit 22, and the auto-focus control unit 22 calculates the central value of auto-focus control at each observation position on the basis of the input information about the position in the Z direction (S18).

After that, the stage 51 is moved in the X direction at the scanning measurement position P2, so that scanning measurement is started (S20). Specifically, first, the auto-focus control unit 22 controls the initial adjustment mechanism 17 at the first observation position on the basis of the central value calculated in S18 to move the holder 16 in the Z direction and to perform initial setting (S22).

Then, the auto-focus control unit 22 controls the image forming optical system-drive unit 15 on the basis of the information about the position of the culture vessel in the Z direction at the first observation position, which is antecedently detected by the first displacement sensor 18a or the second displacement sensor 18b, after performing the above-mentioned initial setting, and performs final auto-focus control (S24). After that, the phase-contrast image at the first observation position is formed by the image forming optical system 14 and is taken by the imaging element 19 (S26). The phase-contrast image at the first observation position, which is taken by the imaging element 19, is output to the display control unit 24.

Figure 10:
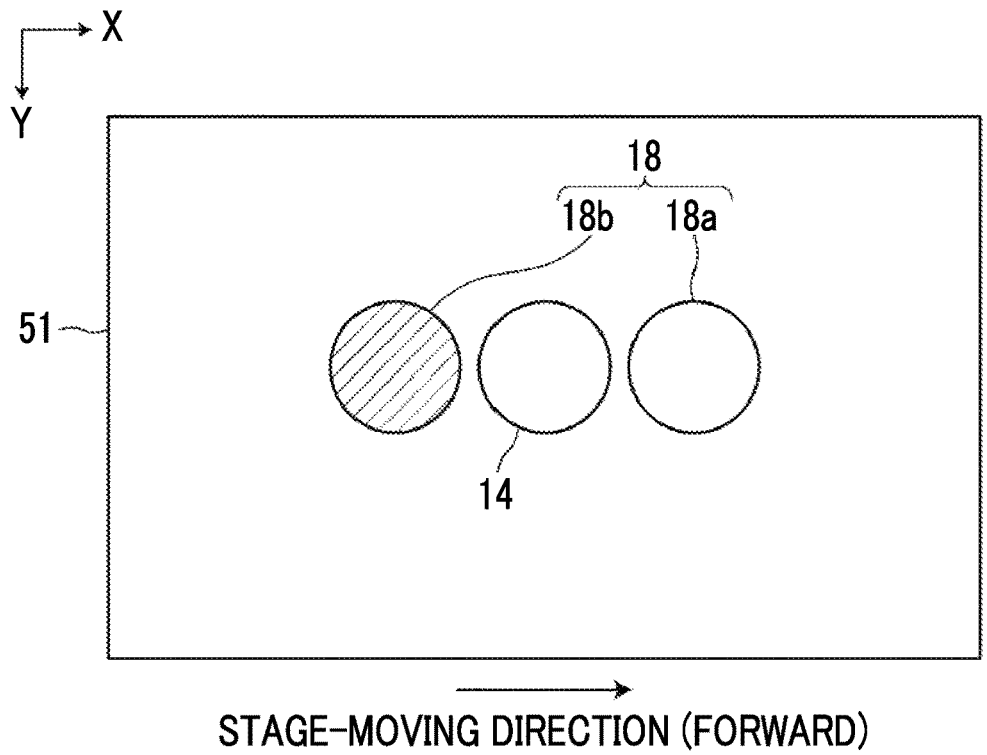
FIG. 10 is a diagram showing a displacement sensor that is used in a case where the stage is moving forward.
Figure 11:
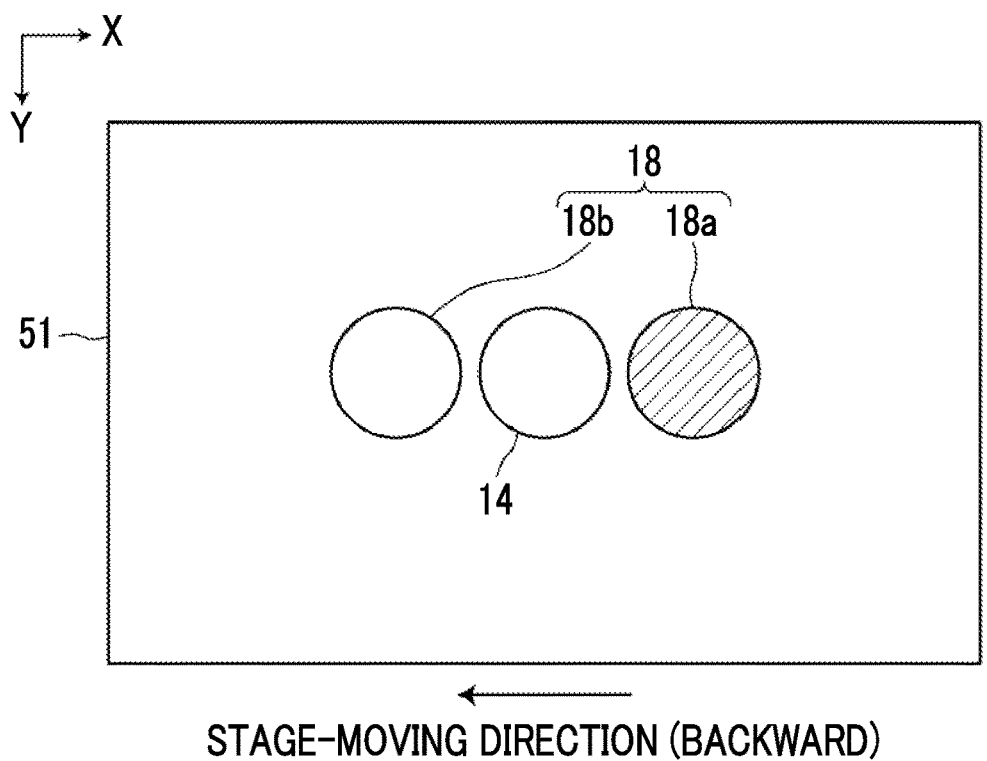
FIG. 11 is a diagram showing a displacement sensor that is used in a case where the stage is moving backward.

Then, it is determined whether or not all the observation positions are scanned (S28). If all the observation positions are not scanned (No in S28), the stage 51 is further moved in the X direction and the Y direction and processing performed in S22 to S26 is repeatedly performed. In this embodiment, the position of the bottom surface of the culture vessel 50 in the Z direction is antecedently detected at each observation position by the first displacement sensor 18a or the second displacement sensor 18b as described above and a phase-contrast image is taken at a time when the image forming optical system 14 has been moved to the observation position where the position has been detected. That is, the taking of a phase-contrast image at a certain observation position and the detection of the position of the culture vessel 50 in the Z direction at a position on the front side of the observation position in the scanning direction are performed in parallel. Further, in a case where the stage 51 is moved forward in the direction of an arrow of FIG. 10, the position of the bottom surface of the culture vessel 50 in the Z direction is detected by the second displacement sensor 18b. In a case where the stage 51 is moved backward in the direction of an arrow of FIG. 11, the position of the bottom surface of the culture vessel 50 in the Z direction is detected by the first displacement sensor 18a. The initial setting based on the above-mentioned central value of auto-focus control may be performed before the image forming optical system 14 reaches the observation position, or may be performed at a time when the image forming optical system 14 reaches the observation position.

If the stage 51 is moved in the X direction and the Y direction and all the observation positions are scanned by the image forming optical system 14 (YES in S28), scanning measurement ends.

After that, the phase-contrast images at the respective observation positions are combined by the display control unit 24 and a composite phase-contrast image is generated (S30), and the generated composite phase-contrast image is displayed on the display device 30 (S32).

According to the microscopic observation system of the embodiment, the position of the bottom surface of the culture vessel 50 in the Z direction is detected while the stage 51 is moved to the scanning measurement position P2 from the initial set position P1, and the initial setting of auto-focus control is performed on the basis of the detected position of the bottom surface of the culture vessel 50 in the Z direction in a case where the stage 51 has been moved to the scanning measurement position. Accordingly, even though there is large variation of the thickness of the bottom portion of the culture vessel or there is the installation error of the culture vessel, auto-focus control can be efficiently performed. Further, since pre-measurement or the like is not performed during an imaging operation, an imaging time can be shortened.

Figure 12:
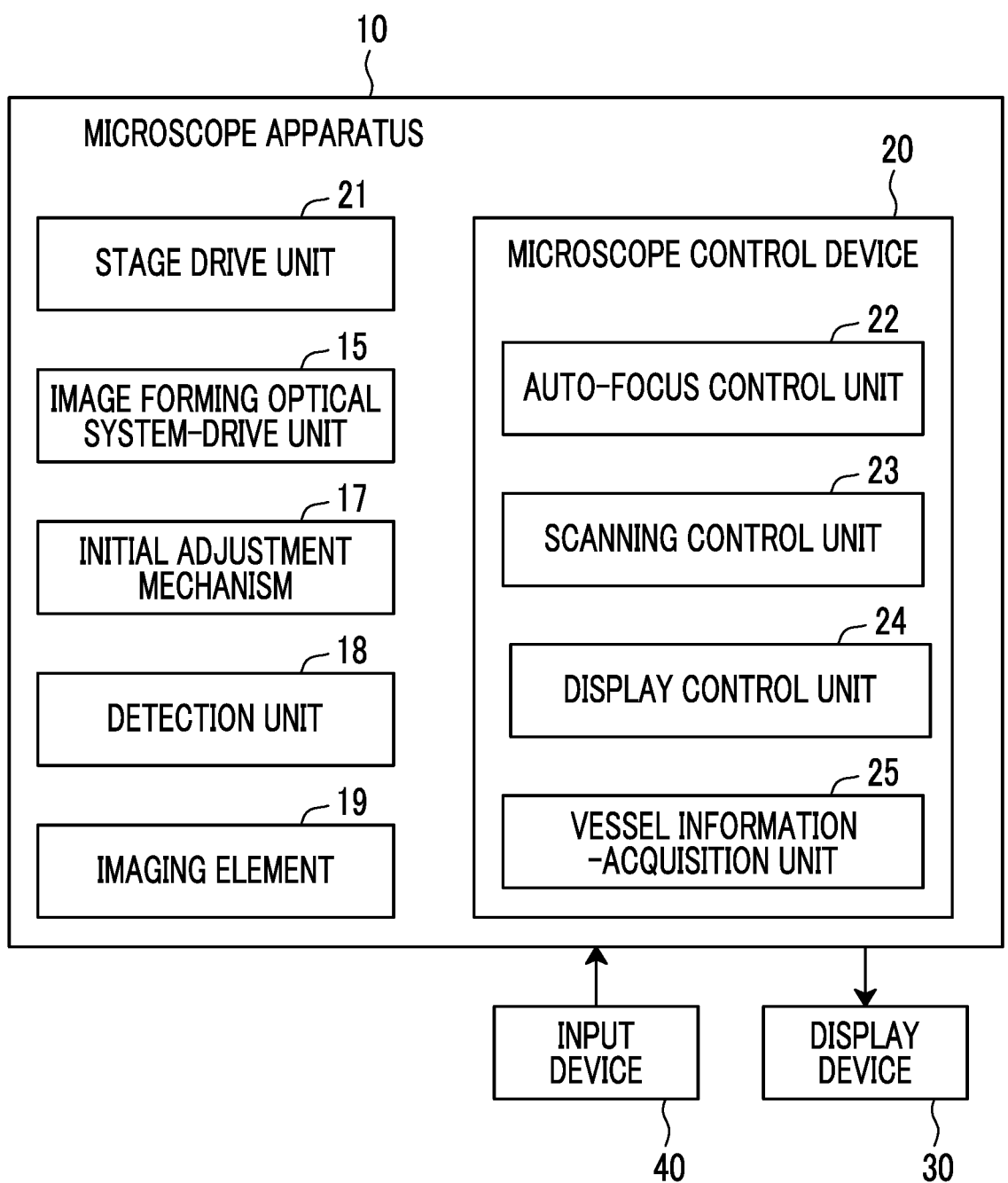
FIG. 12 is a block diagram showing the schematic configuration of a microscopic observation system that uses a microscope apparatus according to another embodiment of the invention.

A well plate including 6 wells is used in the embodiment, but a well plate including 12 wells, a well plate including 24 wells, a well plate including 48 wells, a well plate including 96 wells, and the like may be used other than the well plate including 6 wells. In this case, the movement path of the stage 51 extending to the scanning measurement position P2 from the initial set position P1 may be changed according to the type of the well plate (the type of a vessel) to detect the bottom surfaces of a plurality of wells that are arranged over the entire well plate as much as possible. Specifically, as shown in FIG. 12, the microscope control device 20 may be further provided with a vessel information-acquisition unit 25 that acquires information about the type of a vessel. Further, the scanning control unit 23 may control the stage drive unit 21 on the basis of the information about the type of the vessel, which is acquired by the vessel information-acquisition unit 25, to change the movement path of the stage 51.

For example, a user may set and input the information about the type of the vessel by using the input device 40, or the culture vessel 50 may be provided with a storage medium storing information about the type of the culture vessel 50 and the information about the type of the culture vessel 50 may be read and acquired from the storage medium. Examples of the storage medium include a bar code, an integrated circuit (IC) chip, and the like.

Figure 13:
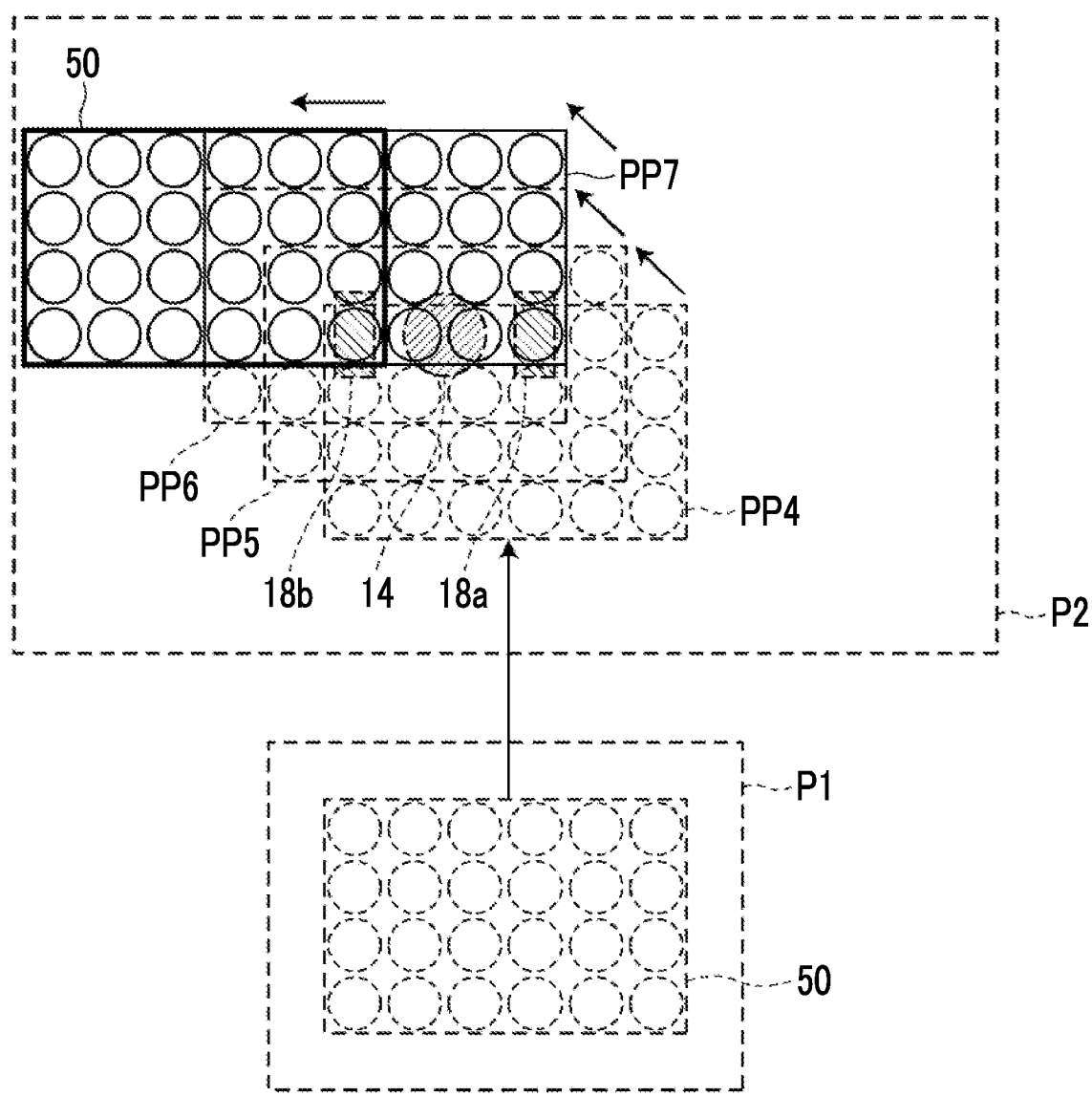
FIG. 13 is a diagram showing the movement path of a stage in a case where a culture vessel is a well plate including 24 wells.

FIG. 13 is a diagram showing the movement path of the stage 51 (culture vessel 50) in a case where a well plate including 24 wells is used as the culture vessel 50. The movement path of the stage 51 in this case also includes movement paths in a plurality of directions. In a case where a well plate including 24 wells is used, first, the positions of the bottom surfaces of 2 wells in the Z direction are detected by the first and second displacement sensors 18*a* and 18*b* at a time when the culture vessel 50 reaches a position PP4 from the initial set position P1. After that, the positions of the bottom surfaces of two wells in the Z direction are sequentially detected by the first and second displacement sensors 18*a* and 18*b* at times when the culture vessel 50 reaches a position PP5, a position PP6, and a position PP7, respectively. In a case where the stage 51 is moved along the movement path shown in FIG. 13, the bottom surfaces of a plurality of wells arranged over the entire well plate can be detected. Accordingly, it is possible to improve the accuracy of interpolation in a case where the central value of auto-focus control at each observation position is to be calculated.

Figure 14:
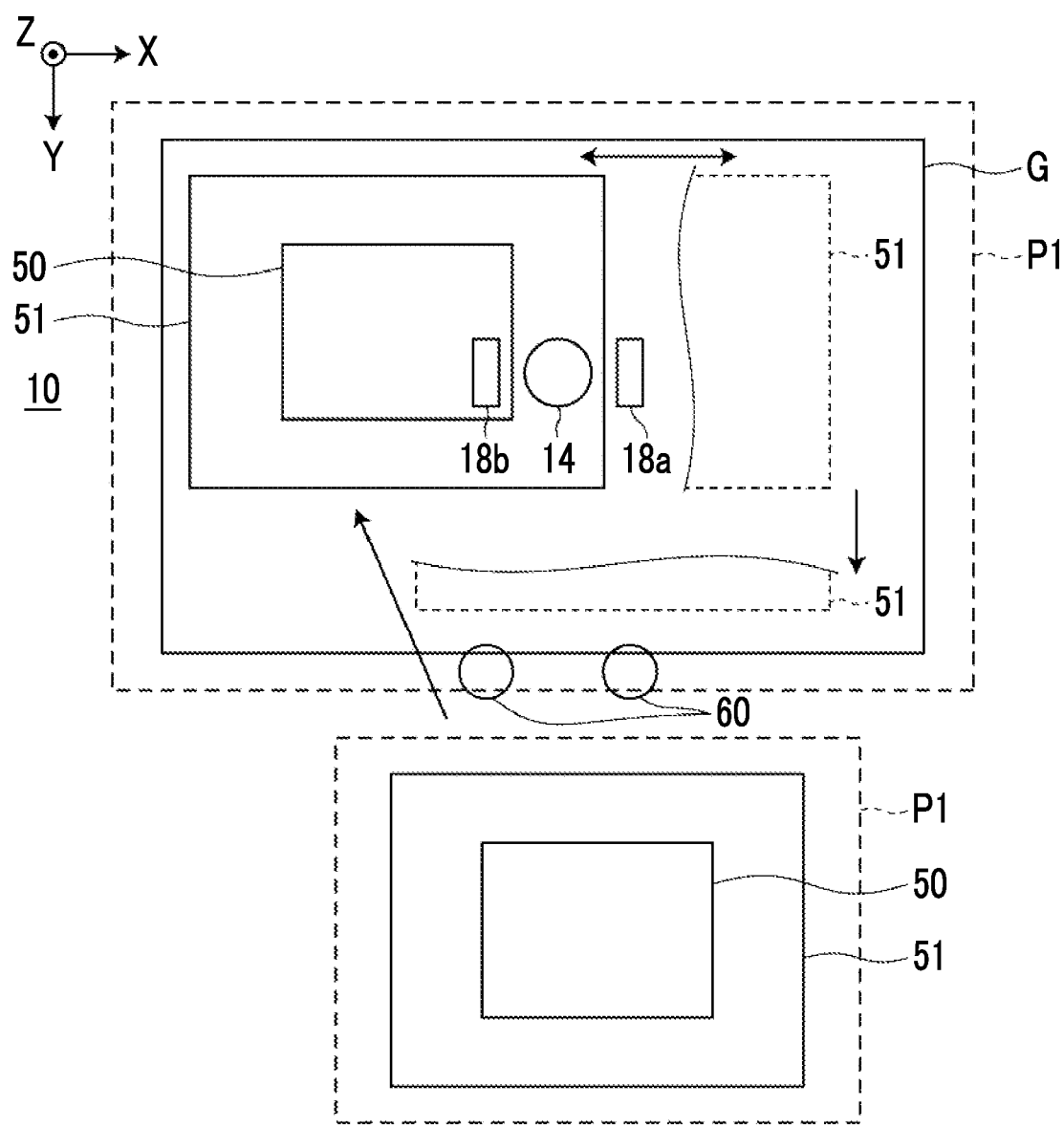
FIG. 14 is a diagram showing an example of a microscope apparatus that is provided with displacement sensors for initial setting.

Further, in the embodiment, the position of the bottom surface of the culture vessel 50 in the Z direction is detected by the first and second displacement sensors 18*a* and 18*b* in a case where the stage 51 is moved to the scanning measurement position P2 from the initial set position P1. However, the invention is not limited thereto, and displacement sensors 60 for initial setting (for detecting focus information) may be provided separately from the first and second displacement sensors 18*a* and 18*b* as shown in FIG. 14. Further, the stage 51 is adapted to pass above the displacement sensors 60 when being moved to the scanning measurement position P2 from the initial set position P1, so that the position of the bottom surface of the culture vessel 50 in the Z direction may be detected by the displacement sensors 60. In this case, the displacement sensors 60 correspond to a focus information-detection unit of the invention.

Furthermore, in the embodiment, the stage 51 is moved so that the observation positions in the culture vessel 50 are scanned. However, the invention is not limited thereto, and an imaging system including the image forming optical system 14, the detection unit 18, and the imaging element 19 may be moved. Further, both the stage 51 and the imaging system may be moved.

Further, the invention has been applied to a phase-contrast microscope in the embodiment, but the invention is not limited to the phase-contrast microscope and may be applied to other microscopes, such as a differential interference microscope and a bright field microscope.

EXPLANATION OF REFERENCES

10: microscope apparatus
11: white light source
12: condenser lens
13: slit plate
14: image forming optical system
14*a*: phase-contrast lens
14*b*: objective lens
14*c*: phase plate
14*d*: image forming lens
15: image forming optical system-drive unit
16: holder
17: initial adjustment mechanism
18: detection unit
18*a*: first displacement sensor
18*b*: second displacement sensor
19: imaging element
20: microscope control device
21: stage drive unit
22: auto-focus control unit
23: scanning control unit
24: display control unit
25: vessel information-acquisition unit
30: display device
40: input device
50: culture vessel
51: stage
51*a*: opening
60: displacement sensor for initial setting
E: scanning end position
G: heat glass
L: illumination light
M: scanning path
P1: initial set position
P2: scanning measurement position
PP1 to PP7: position of culture vessel
S: scanning start position
W1 to W6: well

What is claimed is:

1. A microscope apparatus comprising: a stage on which a vessel in which a plurality of object to be observed are stored is installed; an objective lens that forms an image of the plurality of the objects to be observed stored in the vessel; an actuator that moves the stage between an initial set position where the vessel is to be installed on the stage and a scanning measurement position where observation positions in the vessel are to be scanned by the objective lens; a sensor that detects focus information of the vessel while the stage is moved to the scanning measurement position from the initial set position; and a processor, wherein the processor is configured to move at least one of the stage or the objective lens at the scanning measurement position to scan one of the observation positions of the objects in the vessel by the objective lens, and perform an auto-focus control at every observation position on the basis of the focus information in a case where the stage has been moved to the scanning measurement position.

2. The microscope apparatus according to claim 1, wherein the sensor detects a position of a bottom surface of the vessel as the focus information.

3. The microscope apparatus according to claim 2, wherein the sensor detects at least three portions of the bottom surface of the vessel.

4. The microscope apparatus according to claim 3, wherein the processor is configured to acquire information about a type of the vessel installed on the stage, and
wherein the actuator changes a movement path of the stage extending to the scanning measurement position from the initial set position on the basis of the information about the type of the vessel.

5. The microscope apparatus according to claim 4, wherein the vessel is a well plate including a plurality of wells.

6. The microscope apparatus according to claim 3, wherein the vessel is a well plate including a plurality of wells.

7. The microscope apparatus according to claim 3, further comprising:
at least two displacement sensors that are arranged in a scanning direction with the objective lens interposed therebetween,
wherein the processor is configured to perform the auto-focus control on the basis of the focus information and a position of the vessel in a vertical direction at an observation position that is antecedently detected by the displacement sensor before the objective lens reaches one of the observation position in the vessel.

8. The microscope apparatus according to claim 2, wherein the processor is configured to acquire information about a type of the vessel installed on the stage, and
wherein the actuator changes a movement path of the stage extending to the scanning measurement position from the initial set position on the basis of the information about the type of the vessel.

9. The microscope apparatus according to claim 8, wherein the vessel is a well plate including a plurality of wells.

10. The microscope apparatus according to claim 2, wherein the vessel is a well plate including a plurality of wells.

11. The microscope apparatus according to claim 2, further comprising:
at least two displacement sensors that are arranged in a scanning direction with the objective lens interposed therebetween,
wherein the processor is configured to perform the auto-focus control on the basis of the focus information and a position of the vessel in a vertical direction at an observation position that is antecedently detected by the displacement sensor before the objective lens reaches one of the observation position in the vessel.

12. The microscope apparatus according to claim 1, wherein the processor is configured to acquire information about a type of the vessel installed on the stage, and
wherein the actuator changes a movement path of the stage extending to the scanning measurement position from the initial set position on the basis of the information about the type of the vessel.

13. The microscope apparatus according to claim 12, wherein the vessel is a well plate including a plurality of wells.

14. The microscope apparatus according to claim 12, wherein the stage moves in a direction orthogonal to a direction of an optical axis of the objective lens while the stage is moved to the scanning measurement position from the initial set position.

15. The microscope apparatus according to claim 1, wherein the vessel is a well plate including a plurality of wells.

16. The microscope apparatus according to claim 1, further comprising:
at least two displacement sensors that are arranged in a scanning direction with the objective lens interposed therebetween,
wherein the processor is configured to perform the auto-focus control on the basis of the focus information and a position of the vessel in a vertical direction at an observation position that is antecedently detected by the displacement sensor before the objective lens reaches one of the observation position in the vessel.

17. The microscope apparatus according to claim 16, wherein the displacement sensors are also used as the sensor which detects the focus information, and
the actuator moves the stage so that the stage passes above the displacement sensors while being moved to the scanning measurement position from the initial set position.

18. The microscope apparatus according to claim 16, wherein the sensor which detects the focus information includes a displacement sensor for detecting focus information that is different from the displacement sensors.

19. The microscope apparatus according to claim 1, wherein the movement path of the stage extending to the scanning measurement position from the initial set position includes movement paths in a plurality of directions.

20. The microscope apparatus according to claim 1, wherein the sensor locates in front of the objective lens in a moving direction of the stage, and the sensor further detects the focus information of the vessel after the stage moves to the scanning measurement position and before the objective lens arrives at the observation position.

21. An observation method including moving a stage, on which a vessel in which a plurality of objects to be observed are stored is installed, from an initial set position where the vessel is to be installed to a scanning measurement position different from the initial set position and moving at least one of the stage or an objective lens forming an image of the plurality of the objects to be observed stored in the vessel, at the scanning measurement position to scan observation positions in the vessel and to observe the plurality of objects to be observed, the observation method comprising:
detecting focus information of the vessel while the stage is moved to the scanning measurement position from the initial set position, and
performing auto-focus control at every observation position in the vessel on the basis of the focus information in a case where the stage has been moved to the scanning measurement position.

22. A non-transitory computer readable recording medium storing a microscope apparatus-control program causing a computer to perform moving a stage, on which a vessel in which a plurality of objects to be observed are stored is installed, from an initial set position where the vessel is to be installed to a scanning measurement position, and moving at least one of the stage or an objective lens forming an image of the plurality of the objects to be observed stored in the vessel, at the scanning measurement position to scan observation positions in the vessel, the microscope apparatus-control program causing the computer to perform:
    detecting focus information of the vessel while the stage is moved to the scanning measurement position from the initial set position, and
    performing auto-focus control at every observation position in the vessel on the basis of the focus information in a case where the stage has been moved to the scanning measurement position.

\* \* \* \* \*